Figure 7:
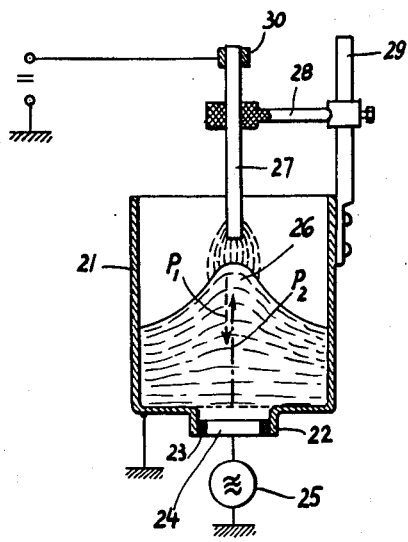

March 3, 1959  F. PRIETL  2,876,083
PROCESS OF PRODUCING CRYSTALS FROM PARTICLES OF CRYSTALLIZABLE
SUBSTANCE DISTRIBUTED IN A LIQUID
Filed June 22, 1954  3 Sheets-Sheet 1
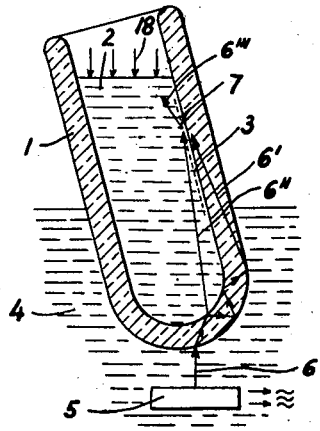
Fig. 1
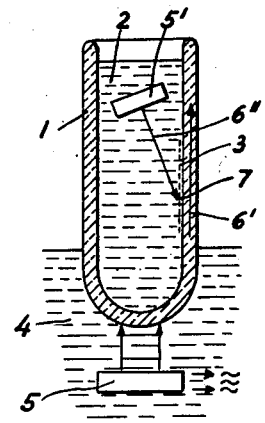
Fig. 2
Fig. 3
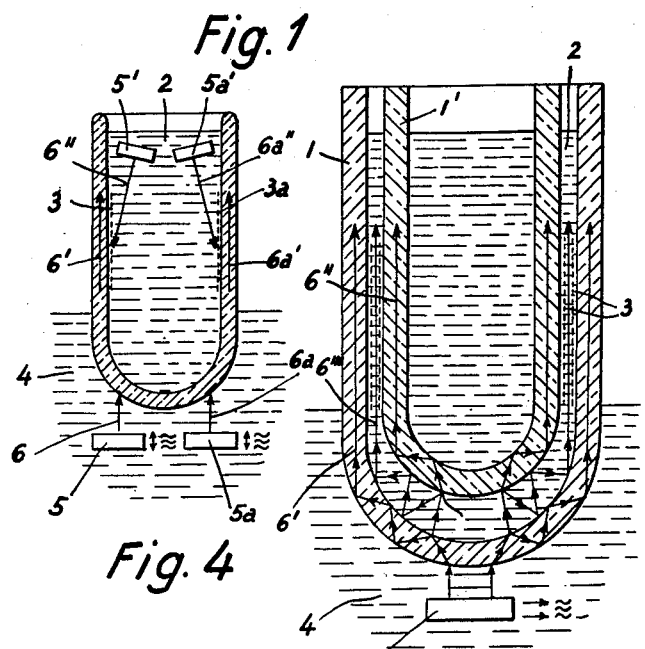
Fig. 4
Fig. 5
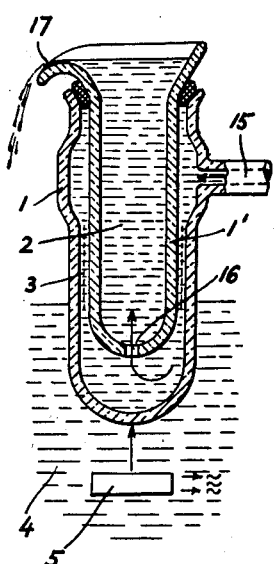
Fig. 6
INVENTOR
Franz Prietl
BY Watson, Cole, Grindle & Watson
ATTORNEYS March 3, 1959          F. PRIETL          2,876,083
PROCESS OF PRODUCING CRYSTALS FROM PARTICLES OF CRYSTALLIZABLE
SUBSTANCE DISTRIBUTED IN A LIQUID
Filed June 22, 1954          3 Sheets-Sheet 3

INVENTOR
Franz Prietl
BY Watson, Cole, Grindle + Watson
ATTORNEYS

United States Patent Office 2,876,083
Patented Mar. 3, 1959

2,876,083

PROCESS OF PRODUCING CRYSTALS FROM PARTICLES OF CRYSTALLIZABLE SUBSTANCE DISTRIBUTED IN A LIQUID

Franz Prietl, Schaftenau, near Kufstein, Tirol, Austria

Application June 22, 1954, Serial No. 438,548

Claims priority, application Austria June 29, 1953

17 Claims. (Cl. 23—295)

This application is a continuation-in-part of my copending application Ser. No. 327,209, filed December 22, 1952, and now abandoned, and relates to a process and apparatus for producing crystals by mechanical vibrations, preferably sonic or supersonic vibrations, controlled to subject particles of crystallizable substance distributed in a liquid to accelerating forces sufficient to cause the formation of crystals under conditions where previously no crystallization has been observed.

In order to bring about artificial crystallization by the application of mechanical vibrations it is necessary that the particles to be influenced are vibrated so that they collide with extremely high kinetic energy. Whereas the usual acoustic treatment of a medium is suitable to give the several particles of that medium an extremely high absolute velocity (particle speed), the relative velocity of adjacent particles remains relatively low because their absolute velocities are only slightly different. This applies also when a train of acoustic waves impinges on a wall which is non-absorbent as to sound, because in this case reflection leads to the formation of a standing wave which has a vibration node at the non-absorbent boundary surface.

For the reason just mentioned, particles distributed in a liquid are influenced by sonic or supersonic vibrations not so much directly by the action of these vibrations, but mainly by the cavitation caused in the liquid if the vibration is of sufficient intensity. Cavitation results from the fact that the cohesion between the several liquid particles is overcome by a sufficiently strong negative pressure created periodically in consequence of the acoustic treatment, and thus the liquid is torn apart so that cavities are formed therein. As these cavities thereafter suddenly collapse, the liquid particles or the particles distributed in the liquid reach very high velocities relative to each other, which are sufficient to cause certain desired effects such as dispersing, emulsifying, or crystallization.

The main disadvantage of the acoustic irradiation methods based on cavitation resides in the fact that cavitation and its effects appear rather at random and cannot be reproduced at will. Moreover, cavitation interferes with the propagation of the vibrations and thereby impairs the matching of the load to the source of energy. In other words, cavitation practically limits the total amount of energy that can be supplied to the liquid.

It is an object of the invention to provide an acoustic irradiation process, which enables a much higher concentration of energy than the processes based on cavitation, and which thereby improves the effects previously achievable by acoustic irradiation and gives effects novel in themselves.

Other objects of the invention will become apparent as the specification proceeds.

It is a feature of the invention to provide a process of producing crystals from particles of crystallizable substance distributed in a liquid, comprising the steps of subjecting the liquid to sound-type mechanical vibrations to impart to said particles an oscillatory motion of substantially predetermined direction, and subjecting said liquid to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said force.

By the application of this process a relative movement of adjacent particles with high energy can be enforced by subjecting these adjacent particles to the action of different forces, which selectively act on the particles and for this reason do not form resultant forces reduced by the partial compensation of oppositely directed forces.

It is another feature of the invention to provide apparatus for producing crystals from particles of crystallizable substance distributed in a liquid, comprising, in combination, a container for the liquid, an acoustic generator arranged to subject the liquid in said container to sound-type mechanical vibrations to impart to said particles an oscillatory motion of substantially predetermined direction, and an energy transmitter arranged to subject said liquid in said container to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said other force.

In one basic embodiment of the process of the invention a thin layer of the liquid adjoining a solid body is excited by two sound-type wave trains which extend at a small angle to each other or are parallel to each other, one of these two wave trains being effective mainly upon one side of the layer and the other of said two wave trains, extending in the solid body, being effective mainly upon the other side of the layer. Thereby adjacent particles in the liquid layer, depending on their position in the layer, are acted upon more strongly by the one of the two wave trains than by the other wave train and are moved relative to each other with high energy. The extraordinary effectiveness of this process of the invention is probably due to the fact that the two closely adjacent sound-type wave trains excite the liquid layer adjoining the solid body to carry out a kind of shear-like vibration which imparts to closely adjacent particles extremely high and oppositely directed instantaneous values of absolute velocities so that their velocity relative to each other reaches previously unattainable high values.

Whereas in this method the one of the two wave trains extends, as has been mentioned before, in the solid body adjoined by the thin liquid layer, the second wave train may be produced either in the liquid itself or in another solid body. For this second form of the invention the liquid may be placed between two closely spaced solid walls which confine the liquid to a thin layer, along each of these two solid walls there being produced one of the two above mentioned sound-type mechanical wave trains.

In another basic embodiment of the invention a sound-type mechanical vibration is used in combination with an electric field, which has at least one component parallel to the direction of said oscillatory motion and differs in respect of the spatial distribution of the forces acting on the particles in the liquid from the oscillatory motion sufficiently to cause a relative movement of adjacent particles with high energy. As hereinafter will be explained more fully, a direct current field, a low-frequency alternating field or a high-frequency alternating field may be employed for this purpose, which field is effective in a gas path between an electrode arranged outside the liquid to be treated and the apex of the swell of liquid produced by the sound-type vibrations and produces intermittent arcing. In certain cases the arcing may be suppressed; then the kinetic energy of charged particles accelerated in the field produced and acting on the surface of the liquid causes the necessary acceleration of the particles in the liquid.

Further aspects of the process according to the invention and examples of apparatus for carrying out this process, as well as examples of applications of the invention, will now be described with reference to the accompanying drawings, in which:

Fig. 1 is a schematic view of a system using a single acoustic generator for exciting the side faces of a thin wedge-shaped liquid layer to produce therein different sound-type vibrations; Fig. 2 is a schematic illustration of the principle of action of the process of the invention; Fig. 3 shows a system differing from the system of Fig. 1 in that two acoustic generators are being used; Fig. 4 illustrates a system having four acoustic generators; Fig. 5 shows a device for producing different sound-type vibrations in a thin liquid layer contained in a capillary cavity formed between two solid walls; and Fig. 6 shows a device which in several respects is similar to the device shown in Fig. 5 but modified so as to be suitable for continuous operation.

Figure 8:
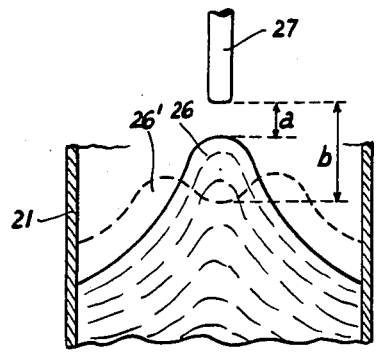
Figure 9:
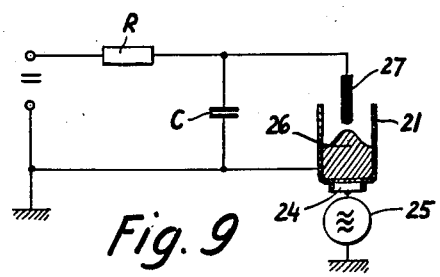
Figure 10:
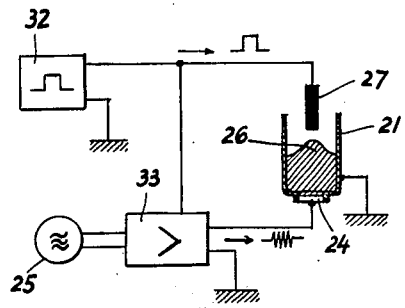
Figure 11:
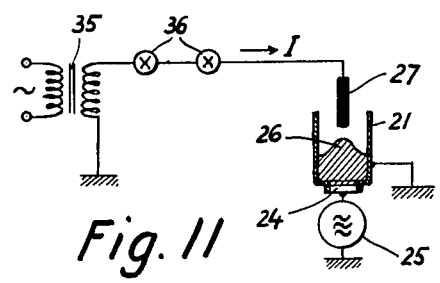
Figure 12:
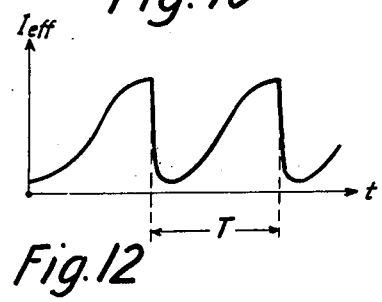
Figure 13:
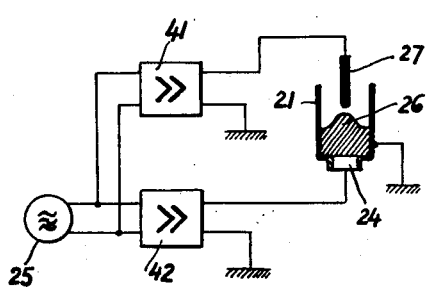
Figure 14:
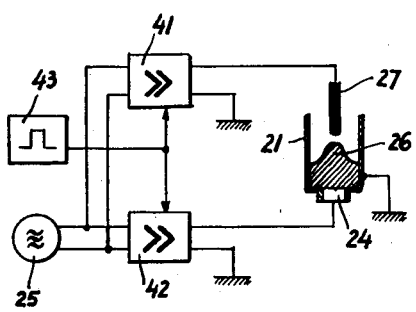
Figure 15:
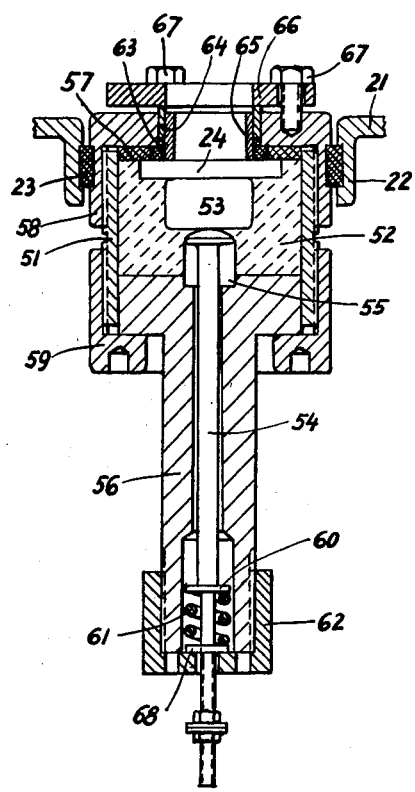

The other figures show embodiments of the invention in which in addition to a sound-type vibration an electric field is employed for exercising an additional influence on the particles in the liquid. In the embodiment shown in Fig. 7 a direct-current field is employed, which forms an intermittent arc. Fig. 8 shows on a larger scale the effect of the intermittent arc. Figs. 9 and 10 illustrate two further embodiments of the invention, operated with an additional direct current field and effecting the intermittent arcing by self-control or separate pulse control. Fig. 11 shows an embodiment of the invention in which the action of the additional force is caused by an alternating field of low frequency, such as mains frequency. Fig. 12 is a diagram which explains the mode of operation of the apparatus shown in Fig. 11. Fig. 13 shows an embodiment of the invention in which an alternating field is used the frequency of which corresponds to the frequency of the sound-type vibrations. Fig. 14 shows apparatus which is similar to that of Fig. 13 and in which the sound-type vibration and the additional alternating field are controlled by high-level pulses. Finally, Fig. 15 shows a possible construction of the source of sound-type vibrations.

Fig. 1 illustrates a simple possibility of carrying out the process of the invention, showing a vessel 1, e. g. of glass, which contains the liquid 2 to be treated by sound-type irradiation. In that liquid 2 particles are distributed which may be, for instance, solid particles. The lower end of the vessel 1 is immersed in a liquid 4 which serves as a transmitting medium and in which vibrations of high intensity are produced by way of a supersonic generator 5. This generator is indicated in Fig. 1 in a schematic manner only and may be, e. g. of the piezoelectric or magnetostrictive type. The supersonic rays 6 emitted by the supersonic generator 5 travel through the transmitting medium 4, until they impinge upon the bottom of the vessel 1. The transmitting medium 4 ensures a favorable matching of the load to the generator 5. In accordance with the known laws of refraction and reflection the rays 6, upon encountering the bottom of the vessel 1, proceed through this bottom of the vessel to the inner surface thereof. There the rays are split up into two wave trains. The one wave train, indicated in Fig. 1 by the ray 6″, passes out of the solid material of the vessel 1 and into the liquid 2 through which the wave train travels at the proper angle of refraction determined by the nature of the materials of the vessel 1 and of the particle-containing liquid 2. This wave train produces a longitudinally directed vibration in the liquid 2. The second wave train, denoted by the reference numeral 6′, proceeds inside of the wall of the vessel 1. The bottom of the vessel 1 is of such curvature that a multiple reflection of the wave train 6′ takes place until it is eventually reflected in a direction which is at a small angle only to the longitudinal direction of the side wall of the vessel 1. In that side wall the wave train 6′ propagates in the form of a longitudinal wave. Depending on the conditions of reflection at the end of the side wall of the vessel and/or on the attenuation within the walls of the vessel, that longitudinal wave 6′ may be primarily either a progressive wave or a standing wave.

Now, in order to cause according to the invention the two boundary surfaces of a thin layer of the liquid to carry out vibrations which differ from each other, the vessel 1 is placed, as shown, in such an inclined position that the sound-type wave train 6″ which travels through the liquid 2 meets at a certain point 7 the sound-type wave train 6′ propagating in the wall of the vessel 1. At the point 7 a liquid layer 3 can be imagined which in this case is of a slightly wedge-like shape. The two wedge faces of this layer are subject to different longitudinal vibrations. Owing to the small angle of incidence of the acoustic (sonic or supersonic) ray 6″ at the vessel wall, the acoustic field will not be disturbed by the formation of standing waves because there is no interference between the reflected ray 6‴ and the incident ray 6″.

Propagating in different media, the two acoustic rays 6′ and 6″ have different wave lengths and, owing to the differences in the lengths of their paths and in their propagation times, these rays will ordinarily reach the point 7 with a phase difference. Best results are obtained when the two vibrations 6′ and 6″ at the point 7 are just in phase opposition, that is to say, when the particle velocities are oppositely directed.

Fig. 2 illustrates these relations for the extreme case that the two acoustic rays 6′ and 6″ extend in parallel to each other so that the interposed liquid layer 3, which according to Fig. 1 was of a wedge shape, is now of plano-parallel shape. The direction of propagation of the two waves is indicated by the two parallel arrows 9 and 10. The particles at the inner side of the layer 3, such as the particle 11, are subject to the influence of the acoustic ray 6″, whereas the particles adjoining the wall of the vessel 1, such as the particle 13, are taking part in the intense vibration 6′ of the wall. Assuming now that owing to a phase displacement of the two waves by about 180 degrees the instantaneous value of the velocity (particle speed) of the particle 11 be represented by the arrow 12 and the instantaneous value of the velocity of the particle 13 by the arrow 14, directed oppositely to the arrow 12, it will be readily seen that under the conditions just mentioned the closely adjacent particles 11 and 13 will collide with high energy and will thereby initiate the desired effects.

Instead of splitting up a single wave train into two acoustic wave trains 6′ and 6″, as illustrated by Figs. 1 and 2, a separate acoustic generator may be used for producing each of the two wave trains 6′ and 6″. Fig. 3 shows such an arrangement. According to that figure, a generator 5 produces the acoustic ray 6′ propagating in the vessel wall 1 along the length thereof, and a separate generator 5′, which may be situated at a suitable inclination directly in the liquid 2, produces the acoustic ray 6″ propagating in said liquid. The two acoustic generators 5 and 5′ may operate at the same frequency or at different frequencies. The proper relative position of the wave trains at the meeting point 7 or in the boundary layer 3, indicated by dash lines, is adjustable by changing the position of the acoustic generator 5′ in the liquid 2, or by changing the position of the acoustic generator 5 in the liquid 4 serving as a transmitting medium.

Instead of the generator 5 and/or instead of the generator 5′ a plurality of generators may be used. Fig. 4 illustrates an arrangement in which both generators 5 and 5' are each replaced by two generators 5, 5a and 5', 5a', respectively. This permits the simultaneous treatment of a plurality of liquid layers as described.

It will be understood that by properly selecting the slope of the vessel 1 and the position of the generator 5 in Figs. 1 and 3 or of the generators 5 and 5a in Fig. 4, each primary ray 6 may be split up into more than two partial rays, which meet at different points.

Fig. 5 illustrates schematically another structural arrangement for carrying out the process of the invention. In this case two cylindrically shaped vessels 1, 1' of glass or other suitable material are used in coaxial arrangement, each vessel having a spherically curved bottom. The inner diameter of the outer vessel 1 is slightly larger than the outer diameter of the inner vessel 1' so that upon the introduction of the vessel 1' into the vessel 1 there is formed between the two vessels 1 and 1' a cylindrical capillary gap. The liquid 2 to be treated is introduced into that gap and thus forms a very thin layer 3. In a manner similar to that which has been explained with reference to Fig. 1, the double-walled vessel 1, 1' is excited by acoustic rays 6 which are generated by an acoustic generator 5 and reach the outer vessel 1 through the intermediary of a liquid 4 serving as a transmitting medium. The rays 6 enter the bottom of the outer vessel 1 at an angle of refraction depending on the characteristics of the liquid 4 and the material and the shape of the bottom of the container 1. Upon reaching the inside surface of said container bottom, the rays are split up each into two partial rays, as has been described in detail in connection with Fig. 1. One partial ray, denoted as 6', propagates in the wall of the outer vessel, first being reflected repeatedly between the inner and the outer surface of the wall of the vessel 1 and then propagating in a direction substantially parallel to the side wall of the vessel 1. The other partial ray, 6'', travels through the liquid between the bottoms of the two vessels 1, 1'. Upon reaching the bottom of the inner vessel 1', the ray 6'' produces acoustic vibrations also in the wall of that inner vessel, being repeatedly reflected between the inside and the outside surface of the vessel 1' until it assumes a direction of propagation substantially parallel to the longitudinal direction of the side wall of the vessel 1'. By suitable vertical adjustment of the inner vessel relative to the outer vessel vibrations may be produced in these two vessels in such a manner that the cross section of the inner vessel at any given level vibrates in phase opposition to the vibration of the cross section of the outer vessel at the same level so that the liquid confined between these walls becomes excited to a kind of shear-like oscillation.

The embodiment shown in Fig. 5 may be modified so as to be suitable for the treatment of a flowing liquid. An example for such modification is represented in Fig. 6. In that case the outer vessel 1 is provided with an inlet pipe 15 for the liquid to be treated. The liquid flows through the lateral capillary gap between the two vessels 1 and 1' to the bottom gap where it enters the inner vessel 1' through an opening 16 in the bottom thereof. From the inner vessel 1' the liquid may be taken by means of a pump (not shown) or may leave that inner vessel through an overflow opening 17. Obviously the direction of flow of the liquid may be reversed.

In the embodiments of the invention to be described hereinafter an electric field combined with a sound-type vibration is caused to act on the liquid and the particles distributed therein.

The apparatus shown in Fig. 7 and its operation may be considered the simplest embodiment of this variant of the invention, from the constructional as well as from the process aspect. A container 21, e. g. of sheet iron, may contain, e. g., a colloidal suspension of soot in water, which is to be treated to enforce a crystallization of carbon. The bottom part of container 21 is provided with a short pipe 22, which has inserted therein with the interposition of a resilient gasket ring 23 a supersonic generator, e. g., a quartz oscillator 24, which is energized by an alternating current generator 25. One terminal of the alternating current generator is grounded. The counter-electrode for the quartz oscillator energized to perform transverse vibrations consists of the liquid itself, which is conductive and connected to ground through container 21. The sound-type irradiation of the liquid produces the known swell 26 at the surface thereof. Above that swell a rod electrode 27, of carbon, is arranged, which by means of a holder 28 of insulating material is vertically adjustably fixed to a support 29 attached to container 21. The electrode 27 has connected thereto by means of a clip 30 a direct current source, one terminal of which, as a rule the negative one, is grounded. The said source provides a strong direct current field between the lower end of electrode 27 and the apex of swell 26.

That direct current field causes the ionization of the gas path, and thus effects arcing. Upon the ignition of the arc the apex of swell 26 is suddenly subjected to compressive forces so strong as to depress the swell, which may now assume the shape indicated with 26' in Fig. 8. Thereby the gas path between the swell and the carbon electrode increases from distance $a$ to distance $b$, at which the voltage is below the sustaining voltage of the arc, whereby the arc is interrupted. Under the influence of the acoustic source the swell subsequently reassumes its original shape 26 and the arc is ignited again, whereafter the process described is repeated.

This intermitting arcing, the frequency of which depends among other factors on the direct current voltage applied and on the viscosity of the liquid treated, has the effect of exercising on the particles in the liquid downwardly directed shock-like forces in the direction of arrow $P_1$, which forces coact with the oscillatory motion of the particles propagated in the direction of arrow $P_2$. Thereby the particles are moved against each other with high energy, whereby an artificial formation of crystals may be caused.

The alternating current generator 25 may operate, e. g. at a frequency of 750 kHz. and an average output of about 500 volt-amperes. In that case the mean height of the swell is about 30 cm. for pure water, and 3 cm. for the dispersion. The distance $a$ between the apex of the swell and the lower end of electrode 27 is selected to obtain a field intensity of about 2000 volts/cm. with the voltage applied to the electrodes.

The embodiment of the invention shown schematically in Fig. 9 is similar to that of Fig. 7 but the direct current voltage circuit includes a resistor R and a capacitor C the time constant of which is suitably so determined as to correspond to the frequency of the intermittent arcing, in order to ensure more uniform operation.

The embodiment shown in Fig. 10 also operates with a direct current field, which in this case is intermittently applied to electrode 27 by a pulse generator 32. Here the alternating current generator 25 is connected to the supersonic generator 24 through an amplifier 33, which is controlled by the pulse generator 32 by periodic high-level pulses so that when the field between the electrode 27 and the liquid treated is at a maximum the acoustic irradiation of the liquid is at a maximum too. In this case of separate control the ionization of the gas path need not be carried to the point where arcing occurs; if it does, the arc will extinguish automatically at the trailing edge of the pulses transmitted by pulse generator 32.

Fig. 11 shows another embodiment of the invention, in which a low-frequency alternating field is employed in combination with the acoustic irradiation of the liquid to be treated. In this case the electrode 27 is fed, e. g. through a transformer 35, from an alternating current means at 50 C. P. S. through resistors having a positive temperature coefficient which resistors are indicated by incandescent lamps 36. In Fig. 12 the current I of electrode 27 is plotted against time *t*. First the current increases by ionization from a low value until arcing occurs, then the current is limited by resistances 36 increasing with temperature, until the arc breaks as a result of the deformation of the swell explained herein above with reference to Fig. 8 and the current drops to its initial value. That cycle is repeated with a time period T. In other respects the mode of action of this embodiment is similar to that described with reference to Fig. 7.

In the practical application of this apparatus an alternating current generator was used with a frequency of 750 kc./s. and a peak power of 2 kva. The secondary voltage of the transformer had an effective value of 1500 volts. The mean current through electrode 27 was 250 ma. The time constant T was about 0.1 sec.

In the embodiment of the invention shown in Fig. 13 the generator 25 energizing the quartz resonator 24 through an amplifier 42 is connected through another amplifier 41 to electrode 27 so that the sound-type vibration acting on the liquid to be treated and producing therein the swell 26 has the same frequency as the alternating current field formed between electrode 27 and the liquid to be treated. In this case the force of the electric field of the electrode may be effective in the form described, with intermittent arcing, or in the form of a silent or non-selfsustained discharge, in which charged particles emitted by the electrode impinge with high energy on the surface of the liquid and accelerate the particles contained therein.

The embodiment shown in Fig. 14 substantially agrees with that of Fig. 13 with the exception that both amplifiers 41 and 42 are controlled by short-time high-level pulses by means of a pulse generator 43 to increase the instantaneous values of the effective energy and achieve a further increase in power.

It has been found that in all embodiments of the invention described there is an optimum distance, which can be found by experiment, between electrode 27 and the apex of swell 26. Where the apparatus is used for the formation of crystals that optimum distance can be determined easily from the clicks heard when crystals form; these clicks will occur in the closest succession in the region of the optimum distance.

In Fig. 15 a possible construction of the supersonic generator is shown, which is inserted with the interposition of a gasket ring 23 into the short pipe 22 at the bottom of container 21. For instance, the generator may consist of an X-cut quartz crystal 24, which is embedded in a resilient plastic insulating matrix 52, e. g. of Oppanol. Arranged at the underside of the quartz oscillator is a lead cushion 53, with which an electrode feed rod 54 is in resilient engagement. The quartz oscillator 24 with the martix 52 is accommodated in a metal sleeve 51. The top of the quartz oscillator 24 is contacted by a rubber ring 57, which by a cap nut 58 is forced against the quartz oscillator. The aforementioned gasket ring 23 is arranged between that cap nut 58 and the short pipe 22 of the continer 21, preferably in suitable annular grooves. For the further sealing of the means holding the crystal a soft rubber ring 63 is provided, which bears against the inside of rubber ring 57 and is held internally by an insulating sleeve 64, e. g., of Plexiglas. That rubber ring 63 is compressed by an insulating sleeve 65 in conjunction with a gland 66 and screws 67 entering cap nut 58.

The electrode feed member 54 may extend in an insulating part 56, which consists, e. g., of Plexiglas and is fixed with the aid of a cap nut 59 to sleeve 51. An additional rubber seal 55 is provided for the contacting portion of the electrode feed member 54. By a spring 61 bearing on a collar 60 the electrode feed member 54 is urged against the lead cushion 53. On the other side the spring 61 bears on a flat ring 68, which lies against the inside of a cap nut 62 screwed on the end of the insulating part 56. That construction withstands high voltage stresses and ensures a perfect seal of the liquid-filled container 21.

In all variants of the process described the liquid treated is suitably passed in a continuous stream through the container; if necessary, it is cooled in circulation. The particles treated may be separated continuously; in this case new particles must be fed into the liquid where it enters the container.

The described process and the devices for carrying out that process disclosed in the foregoing and in the drawing make it possible to move closely adjacent particles distributed in a liquid towards each other with high energy, and without reliance on cavitation. To avoid disturbing cavitation, the liquid to be treated may be subjected to a suitably high static over-pressure, as is indicated in Fig. 1 by the arrows 18. Cavitation being avoided, the intensity of the acoustic irradiation may be increased as desired by increasing the power of the acoustic generators, no disturbing mismatching being possible.

The described process makes it possible, for example, to obtain relative velocities of the individual particles of a dispersion of soot in water which correspond to the relative velocities of a heat motion at about 15.000° C. At such high relative velocities dispersions may be produced within short times of treatment whose degrees of dispersion are beyond those hitherto obtainable. As an example, the production of a bluishly colored dispersion of carbon in water may be mentioned. Also, microorganisms, such as micrococci, which withstood the previously used methods of acoustic irradiation, may be killed by the method of the invention.

A particularly important application of the invention is the initiation and performance of crystallization processes. Up to the present invention, it was generally believed that crystallization in a dispersion was possible only if in addition to the existence of suitable conditions as to pressure and temperature the further condition was satisfied that the degree of dispersion reach the limit of molecular distribution. The smallest particles obtainable so far, however, still contained several hundreds of molecules. It has been found that by the application of the process according to the invention crystals can be obtained even from a relatively coarse dispersion. The reason for this fact has not been safely ascertained as yet. On the one hand, it is possible that the degree of dispersion is initially increased by the application of the process according to the invention to such an extent that the relatively coarse dispersion becomes transformed into one of molecular distribution, whereupon crystallization begins. On the other hand, it is just as probable that the crystallization is enforced merely by the effect of the extremely vigoruos collision of relatively coarse dispersed particles.

As an example, we shall describe the production of carbon crystals whose properties have been found to approximate those of diamond. For producing such artificial carbon crystals an arrangement according to Fig. 1 was used. The acoustic generator 5 consisted of a piezoelectric resonator in the form of an X-cut quartz plate. That quartz plate was of approximately elliptical shape and had a radiant surface of about 20 sq. cm. It was fed by a self-excited thermionic push-pull generator of a frequency of 750 kc./sec. The generator was pulse-controlled, with a pulse-to-space ratio of 1:3 and a pulse power of 2 kv.-a. The supersonic energy emitted by the resonator into the water bath 4 serving as a transmitting medium was about 250 watts at the pulse peak. By means of a suitably shaped concentrator made of cork, part of said energy was focused into a cross-sectional area of about 1 sq. cm. to obtain at that point an acoustic intensity of 400–500 w./sq. cm. Adjacent to the resulting gusher or eddy of water a strong formation of fog occurred and individual droplets of water were hurled up as high as two meters.

For preparing the colloidal dispersion soot was used which was first heated to red heat for a prolonged time to remove any hydrocarbons that might still have been contained therein. Thereafter the soot was mixed with distilled water and dispersed by the action of a low-intensity supersonic field. The resulting dispersion was deeply black in incident light, and was gray with a reddish-brown tinge in permeating light. The specific gravity of the suspension was about 1.05 grams/cc. at about 20° C. This suspension was further diluted with distilled water in a proportion of 1:5.

The resulting liquid was now introduced into the container 1 and the latter was so inserted into the eddy of the liquid 4 that the axis of the container formed a given angle with the gradient of the acoustic field in the eddy. During the following acoustic treatment the excessively large particles of the suspension were reduced in size until there were obtained at the meeting point of the two acoustic rays 6' and 6" the conditions necessary for an abrupt conversion of the dispersed particles into the crystal structure. At said meeting point 7 a bonding of the particles into crystals took place, acoustically perceptible by sharp clicks. In the intermittent supersonic field a liquid flow develops which carries the particles successively past the point of treatment where they, one after the other, become subject to the bonding process.

The process of the invention permits the achievement of a high degree of dispersion, visible from the color of the liquid, much faster than with previously known processes. After a few minutes of acoustic treatment in accordance with the invention, a microscopic investigation of the liquid 2 revealed a large number of crystals, some of them in the form of diffraction discs of about $10^{-3}$ mm. in diameter, and others of such size as to be just discernible with the naked eye. An examination of the crystals so formed showed them to withstand alkalies and acids. The crystals exhibited yellow fluorescence in ultraviolet light, and had an extremely high hardness, a very high combustion temperature and a very high light refraction. They correspond to diamond also in density, since they subside in acetylene tetrabromide.

In a similar manner, crystallization was achieved also with the apparatus according to Fig. 5. The crystals thereby formed included needles of $10^{-3}$ mm. in diameter and of 0.5 mm. length.

Crystals of that type may be used, e. g. in the manufacture of high-grade abrasives.

The process variants and apparatus described with reference to Figs. 7 to 15 lead to similar results but enable a substantial increase in output. This increase may be due mainly to the fact that as contrasted with the process variants and apparatus according to Figs. 1 to 6 the effects produced are not restricted to thin layers but take place within a larger volume.

I claim:

1. The process of producing crystals from particles of crystallizable substance distributed in a liquid, comprising the steps of contacting said liquid with a solid body, producing first and second sound-type wave trains, directing said first wave train through said solid body and directing said second wave train through said liquid in a direction extending close to said solid body substantially longitudinally of said first wave train and longitudinally of the surface of contact between said liquid and said body, to impart by said second wave train an oscillatory motion of substantially predetermined direction to said particles in a thin layer of the liquid adjoining said solid body, and to subject by said first wave train said layer to another force which has at least a component parallel to and spaced from the line of propagation of said oscillatory motion to cause a relative movement of adjacent particles which on the side of said layer contacting said solid body are mainly subjected to the influence of said second wave train and on the other side of said layer are mainly subjected to the influence of said first wave train.

2. The process of producing crystals from particles of crystallizable substance distributed in a liquid, comprising the steps of placing said liquid in the form of a thin layer between two closely spaced solid walls, producing sound-type mechanical vibrations in each of said walls to impart to said particles an oscillatory motion of substantially predetermined direction and to exercise on said liquid another force which has at least a component directed parallel to and sufficiently spaced from the line of propagation of said oscillatory motion to cause a relative movement of adjacent particles part of which are mainly subjected to the influence of the oscillatory motion of the liquid and another part of which are mainly subjected to the influence of said force.

3. The process of producing crystals from particles of crystallizable substance distributed in a liquid, comprising the steps of contacting said liquid with a solid body, producing a primary sound-type wave train, splitting said primary wave train into a first and second secondary sound-type wave trains, directing said first wave train through said solid body and directing said second wave train through said liquid in a direction extending close to said solid body substantially longitudinally of said first wave train and longitudinally of the surface of contact between said liquid and said body, to impart by said second wave train an oscillatory motion of substantially predetermined direction to said particles in a thin layer of the liquid adjoining said solid body, and to subject by said first wave train said layer to another force which has at least a component parallel to and spaced from the line of propagation of said oscillatory motion to cause a relative movement of adjacent particles which on the side of said layer contacting said solid body are mainly subjected to the influence of said second wave train and on the other side of said layer are mainly subjected to the influence of said first wave train.

4. The process of producing crystals from particles of crystallizable substance distributed in a liquid, comprising the steps of contacting said liquid with a solid body, operating two acoustic generators to produce first and second sound-type wave trains, respectively, directing said first wave train through said solid body and directing said second wave train through said liquid in a direction extending close to said solid body substantially longitudinally of said first wave train and longitudinally of the surface of contact between said liquid and said body, to impart by said second wave train an oscillatory motion of substantially predetermined direction to said particles in a thin layer of the liquid adjoining said solid body, and to subject by said first wave train said layer to another force which has at least a component parallel to and spaced from the line of propagation of said oscillatory motion to cause a relative movement of adjacent particles which on the side of said layer contacting said solid body are mainly subjected to the influence of said second wave train and on the other side of said layer are mainly subjected to the influence of said first wave train.

5. The process of producing crystals from particles of crystallizable substance distributed in a liquid, comprising the steps of subjecting the liquid to sound-type mechanical vibrations to impart to said particles an oscillatory motion of substantially predetermined direction, and maintaining an ionized gas path adjacent to said liquid, producing adjacent to said ionized gas path an electric field which has at least a component parallel to the line of propagation of said oscillatory motion and subjecting said liquid to the force of said field acting through said ionized gas path to cause a relative movement of adjacent particles part of which are mainly subjected to the influence of the oscillatory motion of the liquid and another part of which are mainly subjected to the influence of said force.

6. The process of producing crystals from particles of crystallizable substance distributed in a liquid, comprising the steps of subjecting the liquid to sound-type mechanical vibrations to impart to said particles an oscillatory motion of substantially predetermined direction, and to produce on the surface of the liquid a liquid swell, maintaining between said swell and a point spaced above said swell a direct-current potential difference to produce between said point and swell an electric field which exhibits intermittent arcing and which has at least a component parallel to the line of propagation of said oscillatory motion and subjecting said liquid to the force of said field to cause a relative movement of adjacent particles part of which are mainly subjected to the influence of the oscillatory motion of the liquid and another part of which are mainly subjected to the influence of said force.

7. The process of producing crystals from particles of crystallizable substance distributed in a liquid, comprising the steps of subjecting the liquid to sound-type mechanical vibrations to impart to said particles an oscillatory motion of substantially predetermined direction, and to produce on the surface of the liquid a liquid swell, maintaining between said swell and a point spaced above said swell an alternating potential difference to produce between said point and swell an electric field which has at least a component parallel to the line of propagation of said oscillatory motion and subjecting said liquid to the force of said field to cause a relative movement of adjacent particles part of which are mainly subjected to the influence of the oscillatory motion of the liquid and another part of which are mainly subjected to the influence of said force.

8. The process of producing crystals from particles of crystallizable substance distributed in a liquid, comprising the steps of subjecting the liquid to sound-type mechanical vibrations to impart to said particles an oscillatory motion of substantially predetermined direction, and to produce on the surface of the liquid a liquid swell, maintaining between said swell and a point spaced above said swell an alternating potential difference to produce between said point and swell an electric field which exhibits intermittent arcing and which has at least a component parallel to the line of propagation of said oscillatory motion and subjecting said liquid to the force of said field to cause a relative movement of adjacent particles part of which are mainly subjected to the influence of the oscillatory motion of the liquid and another part of which are mainly subjected to the influence of said force.

9. The process of producing crystals from particles of crystallizable substance distributed in a liquid, comprising the steps of subjecting the liquid to sound-type mechanical vibrations to impart to said particles an oscillatory motion of substantially predetermined direction, and subjecting said liquid to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said force and at the same time placing the liquid under a static super-atmospheric pressure to avoid cavitation.

10. The process of producing crystals from particles of crystallizable substance distributed in a liquid, comprising the steps of subjecting the liquid to pulsed sound-type mechanical vibrations to impart to said particles a discontinuous oscillatory motion of substantially predetermined direction and subjecting said liquid to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said force.

11. The process of producing crystals from particles of crystallizable substance distributed in a liquid, comprising the steps of subjecting the liquid to pulsed sound-type mechanical vibrations to impart to said particles a discontinuous oscillatory motion of substantially predetermined direction and producing an alternating electric field which has at least a component parallel to the line of propagation of said oscillatory motion and subjecting said liquid to the force of said field to cause a relative movement of adjacent particles part of which are mainly subjected to the influence of the oscillatory motion of the liquid and another part of which are mainly subjected to the influence of said force, producing high-level pulses to control said alternating electric field, producing high-level pulses synchronous with said first-mentioned pulses and controlling sound-type vibrations with said last-mentioned pulses.

12. The process of producing crystals from particles of crystallizable substance distributed in a liquid, comprising the steps of dispersing said particles in said liquid, subjecting the liquid to sound-type mechanical vibrations to impart to said particles an oscillatory motion of substantially predetermined direction and subjecting said liquid to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said force, and thus to effect crystallization by the kinetic energy of colliding particles.

13. The process of producing crystals from particles of crystallizable carbon distributed in a liquid, comprising the steps of dispersing said particles in said liquid, subjecting the liquid to sound-type mechanical vibrations to impart to said particles an oscillatory motion of substantially predetermined direction, and subjecting said liquid to another force which has at least a component directed parallel to and spaced from the line of propagation of said oscillatory motion to cause a relative movement of adjacent particles part of which are mainly subjected to the influence of the oscillatory motion of the liquid and another part of which are mainly subjected to the influence of said force and thus to effect crystallization by the kinetic energy of colliding particles.

14. The process of producing crystallizable carbon such as artificial diamonds comprising the steps of distributing non-crystalline carbon particles in a liquid, contacting the liquid with a solid body, producing a first supersonic wave train, directing said first wave train through said solid body so as to agitate by said first wave train a thin layer of the liquid adjoining said solid body mainly on that side of said liquid which is in contact with said solid body, producing a second supersonic wave train, directing the main energy of said second wave train through said liquid in a direction extending substantially longitudinally of said first wave train and also longitudinally of the surface of contact between said liquid and said solid body, and agitating with said second wave train said thin liquid layer mainly on that side thereof which is remote from said solid body.

15. The process of producing crystals from particles of crystallizable substance distributed in a liquid, comprising the steps of contacting the liquid with a solid body, producing a first supersonic wave train, directing said first wave train through said solid body so as to agitate by said first wave train a thin layer of the liquid adjoining said solid body mainly on that side of said liquid which is in contact with said solid body, producing a second supersonic wave train, directing the main energy of said second wave train through said liquid in a direction extending substantially longitudinally of said first wave train and also longitudinally of the surface of contact between said liquid and said solid body, and agitating with said second wave train said thin liquid layer mainly on that side thereof which is remote from said solid body.

16. The process of producing crystals from particles of crystallizable substance distributed in a liquid comprising the steps of contacting said liquid with a solid body, producing two supersonic wave trains, directing the main energy of said two wave trains, so that over a portion of their paths the two wave trains travel alongside of each other at a minute distance from each other, one of said two wave trains being sent through said solid body at that side thereof which is in contact with said liquid to agitate a thin layer of said liquid adjoining said solid body mainly on the side in contact with solid body, the other of said two wave trains being sent through said liquid so as to agitate said liquid layer mainly on that side which is remote from said solid body, thereby subjecting the two particles of the crystallizable substance adjoining each other in the direction perpendicular to the thickness of said liquid layer, the one more strongly to the influence of the one of said two wave trains and the other more strongly to the influence of the other of said two wave trains thus causing said adjoining particles to collide with such great energy as to undergo a crystallization bond.

17. Apparatus for producing crystals from a crystallizable substance distributed in a liquid comprising, in combination, a vessel having side walls for confining the liquid to be treated, a first generator of supersonic rays disposed in said liquid to be treated and adapted to produce in said liquid a first ray directed with its main energy to a point of a thin layer of said liquid adjoining the inner surface of one of said side walls, and a second generator of supersonic rays so constructed and arranged as to produce in said side wall a second ray passing through a point situated sufficiently close to said point of said thin layer that of two particles of crystallizable substance in said layer following each other in the direction of the thickness of said layer the one end particle is predominantly under the influence of said first ray and the other predominantly under the influence of said second ray.

References Cited in the file of this patent

UNITED STATES PATENTS

| | | |
|---|---|---|
| 2,163,649 | Weaver | June 27, 1939 |
| 2,170,178 | Williams | Aug. 22, 1939 |
| 2,344,754 | Vang | Mar. 21, 1944 |
| 2,447,061 | Franklin | Aug. 17, 1948 |
| 2,448,372 | Horsley | Aug. 31, 1948 |
| 2,468,538 | Benioff | Apr. 26, 1949 |
| 2,578,505 | Carlin | Dec. 11, 1951 |
| 2,585,103 | Fitzgerald | Feb. 12, 1952 |
| 2,620,894 | Peterson et al. | Dec. 9, 1952 |
| 2,673,811 | Tsunoda | Mar. 30, 1954 |

FOREIGN PATENTS

| | | |
|---|---|---|
| 28,115/30 | Australia | of 1931 |
| 846,395 | Germany | of 1952 |
| 850,248 | Germany | of 1952 |
| 868,230 | Germany | of 1953 |
| 895,749 | Germany | of 1953 |
| 133,526 | Switzerland | of 1929 |